(12) United States Patent
Liu et al.

(10) Patent No.: US 10,636,046 B2
(45) Date of Patent: Apr. 28, 2020

(54) SYSTEM AND METHOD FOR CONDUCTING SURVEYS INSIDE VEHICLES

(71) Applicant: Ford Global Technologies, LLC, Dearborn, MI (US)

(72) Inventors: Yimin Liu, Ann Arbor, MI (US); Perry Robinson MacNeille, Lathrup Village, MI (US); Joe Phillip Pierucci, West Bloomfield, MI (US); Oleg Yurievitch Gusikhin, West Bloomfield, MI (US); Erica Klampfl, Canton, MI (US); Edward K. Krause, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1008 days.

(21) Appl. No.: 13/799,466

(22) Filed: Mar. 13, 2013

(65) Prior Publication Data

US 2014/0278781 A1    Sep. 18, 2014

(51) Int. Cl.
*G06Q 30/02* (2012.01)

(52) U.S. Cl.
CPC .................. *G06Q 30/0203* (2013.01)

(58) Field of Classification Search
CPC ....................................................... G06Q 30/02
USPC ........................................................ 705/7.32
See application file for complete search history.

(56) References Cited

U.S. PATENT DOCUMENTS

| | | | |
|---|---|---|---|
| 6,098,048 A * | 8/2000 | Dashefsky | G06Q 30/02 340/438 |
| 7,062,778 B1 | 6/2006 | Pettersson | |
| 7,219,063 B2 | 5/2007 | Schalk et al. | |
| 7,441,192 B2 | 10/2008 | Pisz | |
| 7,552,063 B1 | 6/2009 | McEachern | |
| 8,050,817 B2 | 11/2011 | Moinzadeh et al. | |
| 8,335,709 B2 | 12/2012 | Todd et al. | |
| 2004/0127192 A1 * | 7/2004 | Ceresoli et al. | 455/405 |
| 2004/0193425 A1 | 9/2004 | Tomes | |
| 2005/0060219 A1 | 3/2005 | Deitering et al. | |
| 2007/0113243 A1 | 5/2007 | Brey | |
| 2007/0226041 A1 * | 9/2007 | Oesterling et al. | 705/10 |
| 2008/0051955 A1 | 2/2008 | Ross et al. | |

(Continued)

FOREIGN PATENT DOCUMENTS

| | | |
|---|---|---|
| EP | 1557810 | 7/2005 |
| EP | 2082190 | 7/2009 |

*Primary Examiner* — Kurtis Gills

(74) *Attorney, Agent, or Firm* — Michael Spenner; Brooks Kushman P.C.

(57) ABSTRACT

A survey system enabling one or more processors to output a survey in a vehicle while allowing a vehicle occupant to engage in the survey. The survey system may communicate with a vehicle computing system enabling one or more processors to receive input representing one or more occupants in a vehicle. They survey system may receive an input representing a current location. The system may determine a workload value for the one or more vehicle occupants and output a survey to the one or more vehicle occupants when the workload value is below a predefined threshold. The system may output a survey related to the one or more occupants and current location. The system may collect survey results and relay the survey results to a remote server for processing. The system may provide a digital reward to the one or more occupants participating in the survey.

1 Claim, 5 Drawing Sheets

(56) References Cited

U.S. PATENT DOCUMENTS

| | | |
|---|---|---|
| 2009/0076915 A1 | 3/2009 | Tighe |
| 2009/0094635 A1 | 4/2009 | Aslin et al. |
| 2010/0023393 A1 | 1/2010 | Costy et al. |
| 2010/0235739 A1 | 9/2010 | Rathi et al. |
| 2011/0265003 A1* | 10/2011 | Schubert ............... G06F 9/4445 715/716 |
| 2011/0276507 A1* | 11/2011 | O'Malley ..................... 705/321 |
| 2011/0301951 A1* | 12/2011 | Basir ....................... G10L 13/00 704/235 |
| 2012/0243751 A1 | 9/2012 | Zheng et al. |
| 2012/0246004 A1* | 9/2012 | Book et al. ................ 705/14.58 |
| 2012/0249343 A1 | 10/2012 | Thomas |
| 2012/0259541 A1 | 10/2012 | Downey et al. |
| 2012/0265616 A1 | 10/2012 | Cao et al. |
| 2012/0323648 A1* | 12/2012 | Dardashti ................... 705/14.4 |
| 2013/0024287 A1 | 1/2013 | MacNeille et al. |

\* cited by examiner

SYSTEM AND METHOD FOR CONDUCTING SURVEYS INSIDE VEHICLES

TECHNICAL FIELD

The illustrative embodiments generally relate to methods and apparatuses for in-vehicle consumer information gathering.

BACKGROUND

U.S. Pat. No. 8,335,709 generally discloses a restaurant customer-survey system and device, which reduces employee fraud when a customer-satisfaction survey embedded in the device is conducted. The survey may be implemented in a pager, tip tray, or other computing device that includes an internally mounted camera that covertly takes a photograph of the survey participant. The photograph is date/time stamped and associated with a table number so that the waiter for the table can be identified. The survey results together with the associated photograph are uploaded to a management database. The restaurant manager can review the photographs to ensure that employees are not fraudulently conducting the surveys rather than customers. The system also enables the customer to interface with the restaurant's point-of-sale system to retrieve the customer's current bill or wirelessly make a payment from the table.

U.S. Pat. No. 7,552,063 generally discloses a system and method for conducting surveys while collecting, processing, and displaying customer satisfaction survey information that enables a product or service provider to evaluate the quality of goods and/or services received based on ratings and reports obtained by performing surveys of customers, employees, and/or staff. The system utilizes an execution platform using a clinical process improvement methodology. The system provides the execution platform with software scripts implementing the clinical improvement process, using drill-down questioning techniques and verbatim comments tailored to the survey participants comments and/or status information to gain insights into the participants' reasons for their opinions. The system obtains raw survey data and processes that data into useful survey information, such as graphs and charts, for presenting to survey consumers who may be remotely located.

U.S. Patent Application 2005/0060219 generally discloses embodiments of the present invention provide integrated, flexible, automated and secure functionality for surveys such as E-surveys. In one embodiment, responsive to an indicator of business performance, a segment of E-survey results data corresponding to the indicator may be extracted. The extracted segment may be compared to an aggregate set of E-survey results data. Any E-survey results data from the extracted segment that statistically differ from responding results data from the aggregate set by a predetermined amount may be identified.

SUMMARY

In a first illustrative embodiment, a survey system enabling one or more processors to output a survey to a vehicle occupant. The survey system may communicate with a vehicle computing system enabling one or more processors to receive input representing one or more occupants in a vehicle. They survey system may receive an input representing a current location. The system may determine a workload value for the one or more vehicle occupants and output a survey to the one or more vehicle occupants when the workload value is below a predefined threshold. The system may output a survey related to the one or more occupants and current location. The system may collect survey response/results and relay the survey response/results to a remote server for processing. The system may provide a digital reward to the one or more occupants participating in the survey.

In a second illustrative embodiment, a computer-implemented method of receiving input identifying one or more occupants in a vehicle and an input defining a current occupant location. The method may determine a workload value for the one or more vehicle occupants and output a survey to the one or more vehicle occupants when the workload value is below a predefined threshold. The method may output the survey related to the one or more occupants and current location. The method may collect survey responses and relay the survey results to a remote server for processing.

In a third illustrative embodiment, a non-transitory computer-readable medium encoded with a computer program for providing instructions to direct one or more computers to receive input representing one or more occupants in a vehicle and an input representing a current location. The computer readable medium may determine a workload value for the one or more vehicle occupants and output a survey to the one or more vehicle occupants when the workload value is below a predefined threshold. The computer program may output the survey related to the one or more occupants and current location. The computer program may collect survey responses and relay the survey results to a remote server for processing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
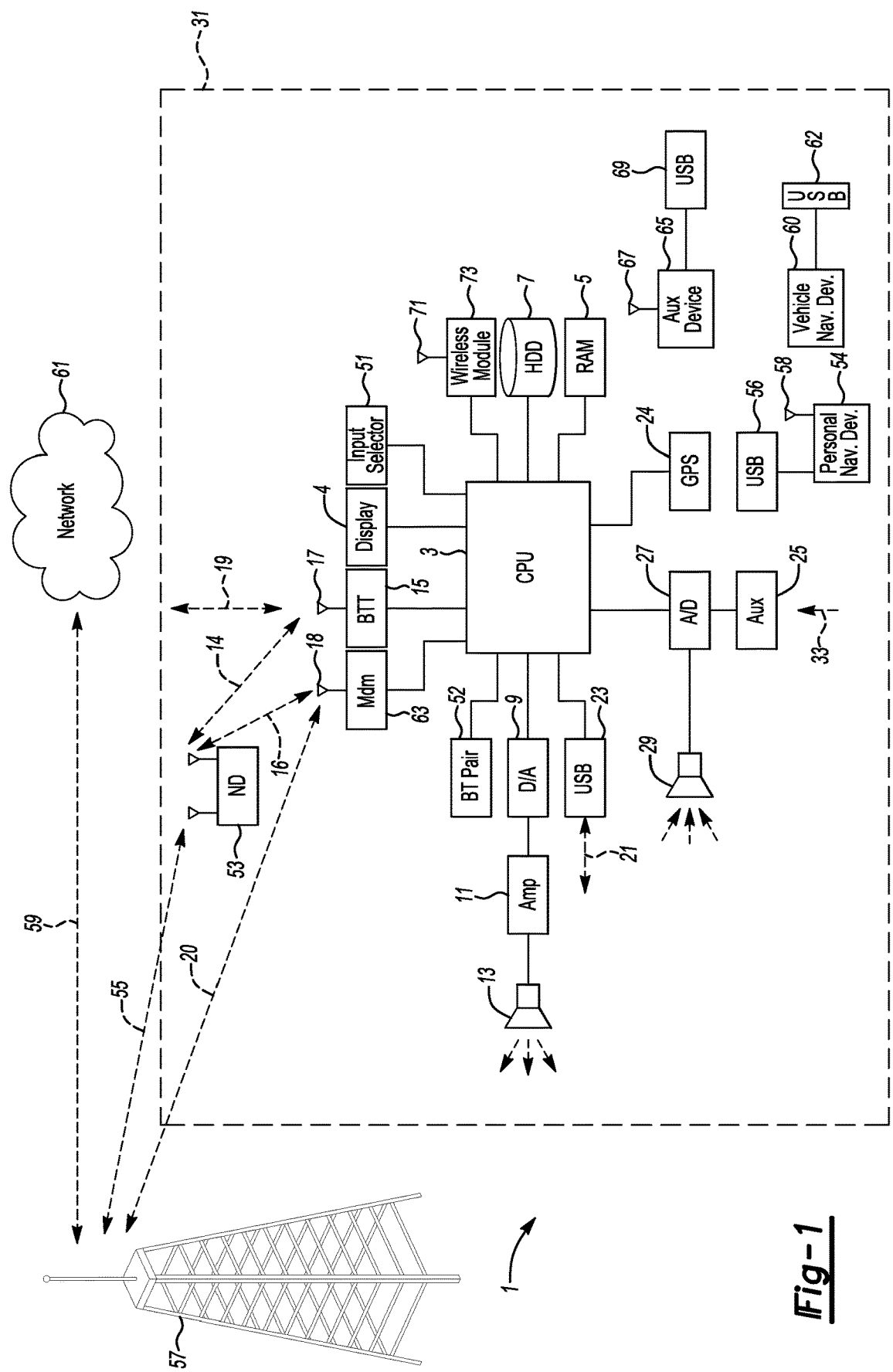
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. The vehicle-based computing system 1 may include other types of human machine interface systems embedded in a vehicle, and/or on a mobile device communicating with the vehicle-based computing system. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In addition to providing media and advertisements in accordance with user preferences, another opportunity exists to provide users with targeted surveys including, but not limited to, marketing surveys and/or political polls. Since people often have a great deal of "spare" time while driving, driving time can be used to verbally or non-verbally (e.g. press a button on a steering wheel) respond to survey questions, so the surveys will have high finishing rate that paper surveys or on-line surveys. While it may be possible to take paper surveys, phone surveys, or online surveys, in other circumstances, in the vehicle surveys can be related to a known vehicle occupant or even related to a business in proximity to the vehicle or a driver/occupant just experienced. In vehicle surveys may also be more time-appropriate than the other survey types, for example the VCS may determine occupant's workload is low while delivering a survey immediately after the occupant just completed a shopping or service experience.

Vehicle infotainment and information systems make the bi-directional transmission of information between a vehicle and a remote server a realistic possibility in many of the modern vehicles on the road. Internet feeds, live radio, songs, movies and other data can all be streamed to a vehicle in real time. Vehicle computing systems may use established internet connections to obtain data from remote sources, and to communicate vehicle-related data to those remote sources for inclusion in remote application processing.

Since an average driver may spend over an hour per day in their vehicle, the ability to obtain interesting content for vehicle delivery can help pass the time. In addition, navigation and vehicle system controls may be optimized using cloud based resources, to improve the driving experience.

Vehicle information and infotainment systems may also have the ability to deliver custom advertisements/surveys to users based on known user preferences. The advertisements/surveys may relate to common shopping stops for a user, to local businesses, or to items the user has indicated or shown a previous preference for purchasing/considering.

Using a vehicle based survey system may provide data needed from a certain group of respondents. It may be very cost effective to conduct a survey using a vehicle based system that may identify an occupant and transmit a survey based on the identified occupants. For example, a company may want to conduct a human resource survey for their employees to understand if they like their work environment and this could be accomplished using the vehicle based survey system allowing the occupant to answer this question in the comfort of their own vehicle. This may give the respondent a sense of privacy and allow for more truthful answers.

The vehicle based survey system may also detect to see if the occupant is alone in the vehicle by using vehicle sensor before presenting private/personal survey questions. For example, the VCS may determine if an occupant is alone by using seat sensors. If the VCS determine that the occupant is alone, the survey system may output a survey that may be of sensitive subject matter.

Figure 2:
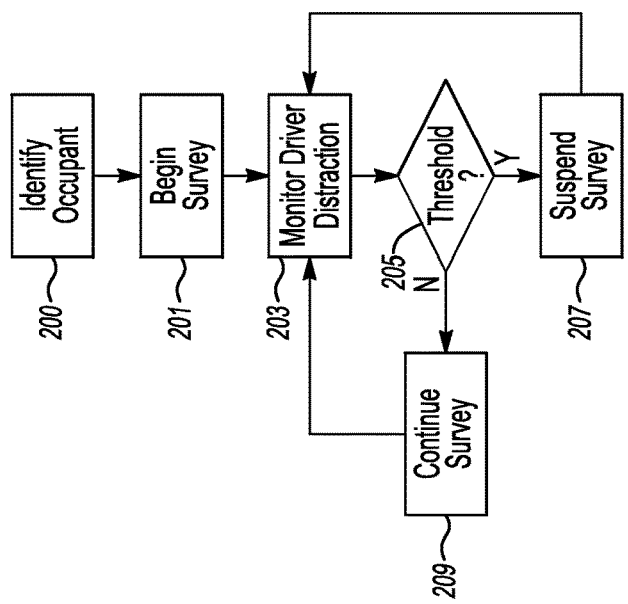
FIG. 2 shows an illustrative example of a survey initiation process.

FIG. 2 shows an illustrative example of a survey initiation process. The survey initiation process may be implemented through a computer algorithm, machine executable code, or software instructions programmed into a suitable programmable logic device(s) of the vehicle, such as the VCS, the entertainment module, other controller in the vehicle, or a combination thereof. In this illustrative example, a survey is determined by the identified occupant in the vehicle at step 200. The system may provide a certain type of survey for a certain group of consumers determined by the identified occupant in the vehicle. Once the occupant is identified by the system, the appropriate survey is presented to the occupant at step 201. The survey can be downloaded to the vehicle for completion and return to a remote system, or the survey can be processed, for example, one question at a time.

Because there is a possibility that an occupant may be driving the vehicle and may need to focus on driving, the survey can be temporarily suspended, or even cancelled if needed. Although not shown, the driver could be given a physical or verbal control that allowed pausing or cancelling the survey or taking the survey later. Also, in this embodiment, the process itself checks ongoing driver distraction monitoring and/or occupant workload at step 203. Monitoring driver distraction may track, among other things, speed changes, steering wheel reversals, cellphone use, traffic patterns, erratic driving behavior and other indicators that a driver may need to focus more carefully on the road and that focusing on a survey may not be completely safe.

Determining an occupant workload may include, but is not limited to, monitoring occupant's use of features and system within the vehicle passenger compartment. The monitoring may include, but is not limited to, the use of the climate control system, entertainment system, and/or navigation system. The system may have a predetermined workload threshold value to decide whether or not a survey may be presented to an occupant. The predetermined workload threshold may be set using factory settings, or defined based on a certain user (i.e. a teenage driver may have a lower threshold). For example, the VCS may delay and/or postpone the output of a survey if the occupant is recognized as the vehicle owner's teenage daughter and the occupant is currently adjusting the climate or radio controls. Another example, the VCS may delay the output of a survey to an occupant if the occupant is currently listening to navigation instructions. These are just a few examples of how workload may be determined by the VCS.

At step 205, the system may determine a certain threshold of driver distraction that may be acceptable for a survey to be initiated and/or continued for a vehicle occupant. Accordingly, if a driver distraction level is above a certain threshold the process may suspend the survey until a time when the distraction level has fallen to an acceptable point at step 207. Rather than asking the driver if they were distracted during the survey, this and other questions such as "what is your pulse rate" could be measured by SYNC and automatically returned with each answer on the survey.

Once the driver distraction level has fallen back below a certain point, or as long as it does not cross a threshold distraction level, the survey continues at step 209.

Figure 3A:
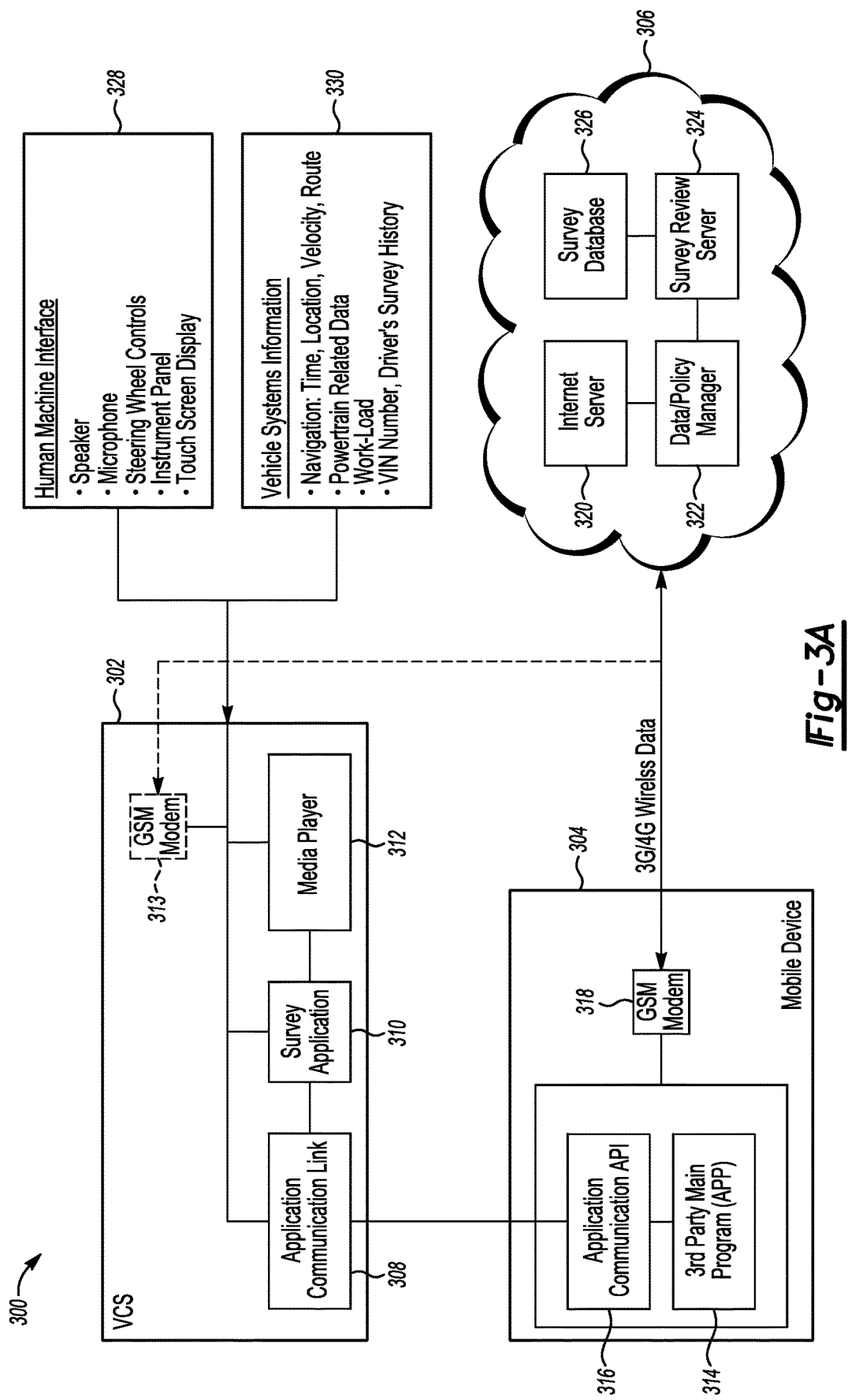
FIG. 3A shows an illustrative example of a survey application embedded in a vehicle computing system.

FIG. 3 shows an illustrative example of a survey application embedded in a vehicle computing system. Once the interactive survey system 300 identifies a vehicle occupant, the survey application 310 may initiate a specific survey tailored to that identified occupant in the vehicle. The system may deliver the survey to the vehicle occupant, and may take care of managing the communication of data between the survey application, the occupant, and the survey conductor.

The interactive survey system 300 may comprise a VCS 302 having one or more processers embedded with a GSM Modem 313, Media Player 312, Survey Application 310, and an application communication link 308 allowing for additional components to communicate with the VCS 302. Using the application communication link 308, the VCS 302 may communicate with a mobile device 304 and/or output device located in a vehicle using Bluetooth technology.

The GSM modem 313 may allow the VCS 302 to communicate over the mobile network. In one example the GSM Modem 313 may be used to provide mobile internet connectivity allowing the VCS to receive additional data and survey information from a Cloud 306. The Cloud may include, but is not limited to, an internet server 320, data policy manager 322, survey review server 324, and/or a survey database 326. The cloud 306 may allow, but is not limited to, processing of the survey response, translate voice message answers into text, obtain relevant occupant information, filtering occupant responses, and/or merge the data with the occupant information and store the response and/or results in a format so that it can be analyzed by a survey conductor. In an alternative embodiment, the additional data and survey information from the Cloud 306 may be accomplished in the vehicle and/or by the VCS.

The interactive survey system 300 may detect a vehicle location based on the VCS receiving vehicle system information 330 including, but not limited to, navigation data. The vehicle system information may also include, but is not limited to, time of day, vehicle speed, vehicle acceleration, vehicle velocity, route, occupant workload, and/or driver's survey history.

The survey application may receive a response by an occupant taking a survey by submitting survey answers using inputs on the vehicle's human machine interface (HMI) 328. The HMI 328 communicates with the VCS and allows the occupant to receive survey questions and submit survey answers by using one or more of the existing components in the vehicle including, but not limited to, steering wheel controls, instrument panel, touch screen display, microphone, speakers, and/or other vehicle sensor or systems. The vehicle HMI 328 integrated with the interactive survey system will be discussed in more detail at FIG. 4. The mobile device 304 may also be used as an input device allowing an occupant taking the survey to respond using the mobile device.

In one illustrative embodiment, the VCS 302 may communicate with a mobile device 304, or a remote computing system connected through the mobile device 304, for communication to the survey application 310. The mobile device 304 may include, but is not limited to, an embedded cellular modem, embedded WiFi device, Bluetooth transmitter, Near Field Communication connected to phone, brought-in cellular device like a USB modem, MiFi, smartphone that may be connected to the vehicle through SYNC or other Bluetooth pairing device, or a PC network that may be connected to the vehicle through SYNC or other Bluetooth pairing device. The VCS 302 may wirelessly communicate a data transmission with the survey application 310 embedded within the VCS 302 with the use of an application communication 308. Once the vehicle system has enabled the application communication 308, the mobile device 304 may be used by a vehicle occupant to engage with the survey application 310.

For example, without limitation, the VCS 302 may detect that the vehicle is currently located at a McDonald's restaurant. The VCS may determine that the vehicle is at a McDonald's with information being received from one or more vehicle systems or sensors including, but not limited to, GPS coordinates, navigation data, and/or a camera system located outside the vehicle that may detect business names and street names. The survey interactive system may initiate a particular survey based on the vehicle being located at McDonald's and related to the recognized vehicle occupant. Based on the received information from several vehicle systems and sensors, the survey application system may present a McDonalds survey on the service and/or quality of the food the occupant received at that McDonald's location.

To further elaborate on the above example, the interactive survey system 300 may analyze several variables received from one or more vehicle sensors and/or subsystems to further tailor the survey generated for the identified vehicle occupant. Based on the further analysis of the interactive survey system 300, the VCS 302 may determine that the vehicle is located at a McDonald's drive-thru. The VCS 302 may make this determination that the vehicle is in a drive-thru ordering process based on wheel speed, engine revolutions-per-minute, and/or navigation data. Once the interactive survey system 300 recognizes that the occupant is waiting or has just received service at the McDonald's drive-thru, the system may generate a tailored survey specific to the McDonald's drive-thru experience.

The McDonald's drive-thru survey may include several questions regarding drive-thru service, for example, "was the McDonald's drive-thru employee polite", or "did you receive your food in an appropriate amount of time." The survey could provide, as a reward, a coupon or discount for the product, or some other incentive for the occupant to take the survey. Since the occupant may be listening to a multitude of survey questions while in the vehicle, this may allow marketers to focus on specific needs and wants of that particular customer or service. Additionally, since the audience is a captive one, with little else to do other than arrive to their next destination, there should be a higher incidence of opting in to a survey.

The interactive survey system may present the survey as shown in exemplary, non-limiting fashion in FIG. 2. The interactive survey system may display the survey in several formats including, but not limited to, over the vehicle speakers, on the center console user display screen, instrument panel, and/or a mobile device application communication API 316 communicating with the VCS. The survey application may transmit the survey to a mobile device that may be paired to the VCS using Bluetooth technology.

The mobile device 304 may receive the survey from the survey application through the application communication link 308 cooperating with the mobile device's application communication API 316. A main program application 314 on the mobile device 304 may then receive the survey through the API 316 interface and present it to the occupant. The occupant may then take the survey on the mobile device with audio questions over the mobile device's speaker while having the mobile device's microphone receiving audio answers from the occupant, and/or using the mobile device to read the text of questions and select/type the survey answer, or a combination of both.

Once an occupant has completed the survey the mobile device 304 may deliver the completed survey to one or more recipients including, but not limited to, the survey application 310 at the VCS 302, and/or the internet server 320/survey database 326 at the Cloud 306. The mobile device 304 may be able to transmit the completed survey to the VCS using the Application Communication API 316. The mobile device 304 may be able to transmit the completed survey to the internet server 320, and/or survey database 326 using the GSM Modem 318 on the mobile device 304. In another example, the mobile device may transmit the completed survey to the VCS for further analysis and processing.

The interactive survey system may allow specific and tailored surveys to reach a targeted group of respondents repeatedly by effectively validating the identity of the person engaging in the survey. The survey system may determine the identity of a vehicle occupant using one or more vehicle sensors and systems. The one or more sensors and systems to determine an occupant may include, but is not limited to, the occupant's mobile device paired to the VCS, driver weight, assigned key for the occupant, and/or camera's mounted in the vehicle.

For example, the interactive survey system may determine that the paired mobile device 304 currently communicating with the VCS 302 belongs to the vehicle owner's child. The child is 17 years old; therefore the occupant may not vote, drink or smoke cigarettes. The interactive survey system may determine that a political poll survey is not suitable for the 17 year old since he cannot vote. The system may also determine that the driver may not be suitable to take a survey based on one or more conditions including, but not limited to, if the occupant is alone in the vehicle, workload is low, vehicle speed, and/or driving distance of vehicles around the occupant's vehicle. In this example based on the detected 17 year old occupant, the system may determine that the survey will be sent once the vehicle is in the park gear.

Specific survey question may be generated by the survey application based on the identified occupant. In one example, after the interactive survey system recognizes the occupant in a vehicle, the survey application may communicate with one or more of the internet server 320, data/policy manager 322, survey review server 324, and/or survey database 326 to determine a survey for the occupant. The data/policy manager 322 may provide information regarding the content of the survey and if the occupant is in a suitable environment to take a survey. These data/policy manager guidelines and variables may be set up a vehicle owner and may include, but is not limited to, the length of a survey, the content of a survey, and/or subject matter related to a survey. The survey review server 324 may provide the survey application several surveys that may be related to one or more of the identified occupant, current GPS location, and/or time of day. The related survey may be based on collected data of past surveys the occupant completed, a GPS location of the occupant, and/or a learned occupant buying behavior. For example, the learned occupant buying behavior could be that on the weekends the occupant enjoys lunch at Panera Bread restaurant.

In an alternative embodiment, the survey application may communicate with one or more processors in the vehicle to provide information regarding the content of the survey and if the occupant is in a suitable environment to take a survey. The survey review process may be located in a vehicle and provide a related survey to the identified occupant. The system may operate without a server allowing the additional processing, analyzing, and calculating done within the vehicle and/or a mobile device wirelessly communicating with the VCS.

In another example, the interactive survey system may determine that it is 7:00 AM, on a Tuesday and the recognized occupant usually stops for coffee and a breakfast sandwich during a weekday morning commute. In this example the survey review server 324 may include the transmission of several surveys for a multiple retailers that have questions about their breakfast menu. The interactive survey system may transmit a more tailored survey based on additional vehicle system information including, but not limited to, the navigation route. Once the survey application receives the one or more suggested surveys from the survey review server 324, the survey application may decide and transmit the better type of survey to the occupant for that morning commute.

The interactive survey system 300 may communicate with the survey database to transmit targeted surveys, receive survey submissions, and analyze survey response/results. The survey database 306 may receive survey submissions, and serve as a survey screener while allowing analysis software to provide the response and/or results to the respective survey owner. The screening process of the survey database may screen certain respondents for some surveys based on vehicle systems and sensor inputs (i.e. time of day, GPS coordinates, workload, etc. . . . ). The survey database may allow the survey provider to contact the respondent again by transmitting to the survey review server that a specific occupant and/or vehicle are requested additional survey information by the provider. The interactive survey system allows for survey providers to follow up with a targeted occupant who may have submitted a previous survey to that provider.

Figure 3B:
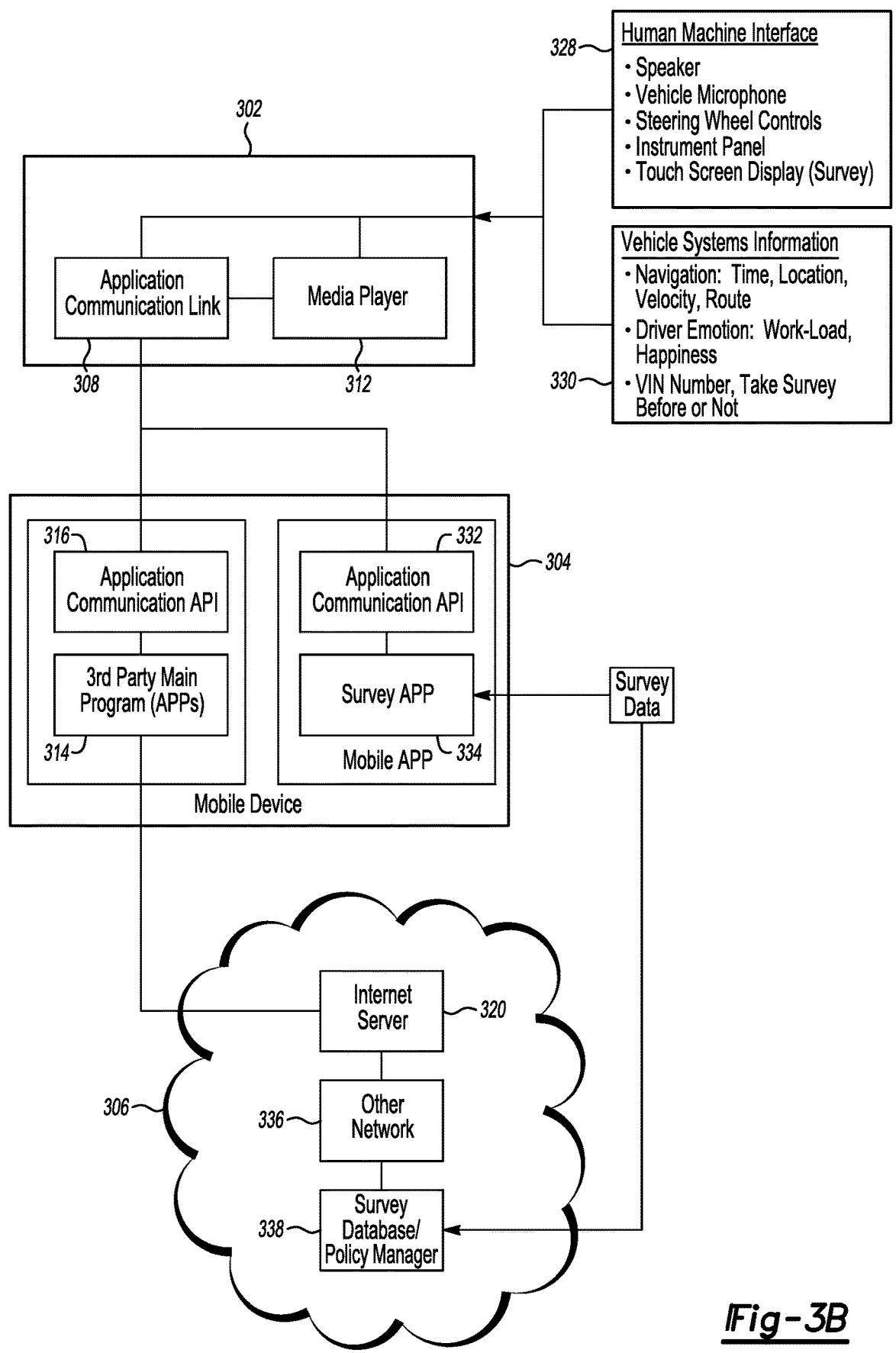
FIG. 3B shows an illustrative example of a survey application embedded in a mobile device for communication with a vehicle computing system.

FIG. 3B shows an illustrative example of a survey application embedded in a mobile device for communication with a vehicle computing system. Once a vehicle occupant has had their mobile device authorized and paired to communicate to the VCS, one or more mobile device applications may interact with the VCS. An example of mobile device applications cooperating with the VCS is the Ford AppLink system that starts the application on the mobile devices and communicates with the VCS. The drivers could use the vehicle HMI to interact with the survey application 334 embedded in a mobile device 304. The survey application in the mobile device 304 may deliver surveys, find the drivers' demographic data via VIN number and store/transmit all the final survey data in the server.

With the survey application on a mobile device 304, the survey database/policy manger 338 may recognized that mobile device and provide survey's that may already be tailored to the mobile device user. The communication of the mobile device 304 with the VCS 302 allows for additional information to be transmitted to the survey database/policy manager to further ensure a survey may be related to the vehicle and occupant environment including, but not limited to navigation data, occupant workload, and/or time of day.

An application communication API 332 may allow for the survey application 334 to transmit and receive information from the VCS 302. The VCS may allow the survey to be present to the occupant over the vehicle infotainment system. The vehicle occupant may receive and answer survey questions using the vehicle HMI 328 including, but not limited to, the vehicle speaker, vehicle microphone, steering wheel controls, and or touch screen display.

The occupant may decide to save an incomplete survey for a later time. With the survey application 334 on the mobile device 304, the occupant may save the survey in the vehicle and continue to complete the survey using the mobile device 304 outside the vehicle. The survey application embedded on the mobile device allows the respondent to continue the survey from inside or outside a vehicle. For example, the occupant may save the unfinished survey in the vehicle before she leaves the vehicle and continue to complete the survey after she comes back to the vehicle.

In one illustrative embodiment, the survey database/policy manager 338 may provide parameters on what type of survey to present and when to transmit the survey to the mobile device 304. For example, the survey database/policy manager 338 may deliver a survey with the right length based on the distance of the driving trip. Another example, the survey database/policy manager 338 may communicate with other networks 336 to determine a timely transmitted survey after a specific event including, but not limited to, an occupant making a purchase, occupant leaving a particular retailer/service, and/or vehicle detected in an area that is known to be a frequent shopping stop for the occupant.

Survey questions may be answered using one or more inputs including, but not limited to, verbal or non-verbal responses using the survey application 334 embedded on the mobile device 304. The non-verbal may include, but is not limited to, touch, haptic, steering wheel controls, infotainment controls, and/or body movement/gestures detected by an in-vehicle camera and transmitted to the mobile device 304. The mobile device may include, but is not limited to, smart phones, personal computers, tablets, and/or other cellular devices.

In one example, survey questions may be conducted in any type of voice including, but not limited to, machine generated, celebrity, and/or a voice recorded in any language. The survey system may determine the voice to use based on the recognized occupant. For example, a Ford survey may use the voice of their CEO, Alan Mulally.

Figure 4:
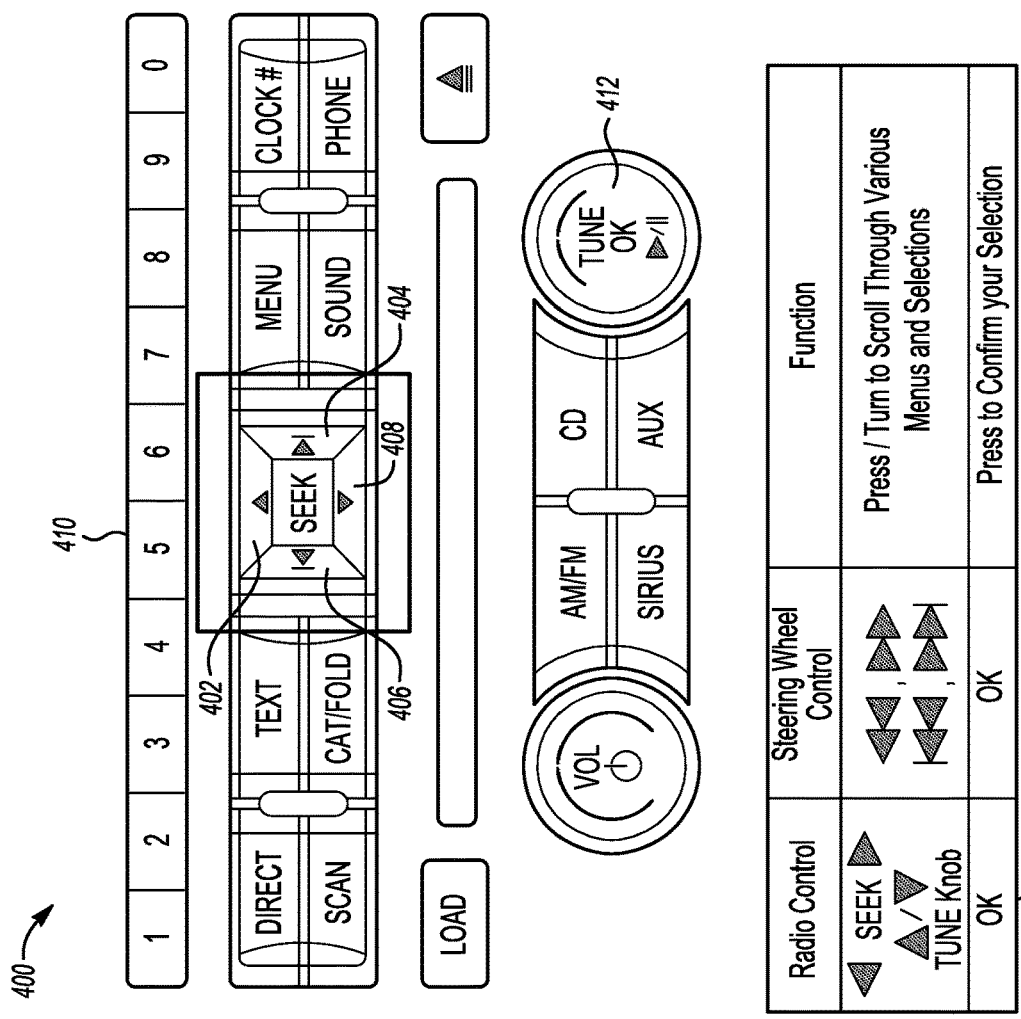
FIG. 4 shows an illustrative example of an entertainment system used for control of occupant input during a survey.

FIG. 4 shows an illustrative example of an entertainment system used for control of occupant input during a survey. A vehicle occupant may use existing buttons located in the vehicle to control a survey. The vehicle system may allow one or more existing buttons or user inputs selectors to be transformed for temporary use as survey inputs in an interactive survey system 300. The one or more existing buttons or user inputs may include, but is not limited to, radio controls, steering wheel selector switches, and/or the use of a touch screen display.

An example of using existing buttons located in a vehicle to control a survey may include, but is not limited to an entertainment control system 400. The survey system may communicate over a controller area network (CAN) bus to communicate to the entertainment system control 400 for integration of the survey application.

The entertainment control system may include, but is not limited to radio controls. The radio controls may include a seek-up arrow 402, seek-forward arrow 404, seek-backwards arrow 406, and a seek-down arrow 408. The seek arrows allow a respondent to the survey scroll through survey menus, selections, and/or questions. The tune knob 412 may also serve as a way to scroll through survey menus, selections, and/or questions. If a respondent presses down on the tune knob 412 it may select or confirm a selection during a survey.

The radio controls may also include a row of number 410 that may be used in the interactive survey system. The survey application may present a survey to a respondent allowing for answers to be corresponding to the row of numbers 410. An example may be a survey requesting a respondent to rank the quality of service using the row of number 410 they received during their recent vehicle dealership visit. The survey may request the respondent to rank the quality of service by selecting '1' through '9' where '1' being the best and '9' being very unsatisfied.

In one embodiment the entertainment control system may present user instructions 414 to a vehicle occupant that may explain the use of radio controls to take the survey. The user instructions 414 may be presented on one or more devices including, but not limited to, the center console display screen, instrument panel, and/or a vehicle occupant's mobile device communicating with the VCS using Bluetooth technology.

In another embodiment the vehicle occupant may answer the survey questions using voice responses. The voice responses may navigate between questions with the spoken equivalents of the radio controls. An example of the voice responses for an interactive survey system may include, but is not limited to, tune knob 412 may be replaced by 'back' or 'last question' (spoken) and/or 'skip' or 'next question' (spoken) to navigate between the questions. In another example, to navigate between answers a vehicle occupant taking the survey may use the seek arrows 402, 404, 406, 408 or may use audio request including, but not limited to, 'last answer' (spoken), 'accept answer' (spoken), 'next answer' (spoken). The spoken voice responses may allow the occupant to navigate a survey without having to select or interact with vehicle controls.

Figure 5:
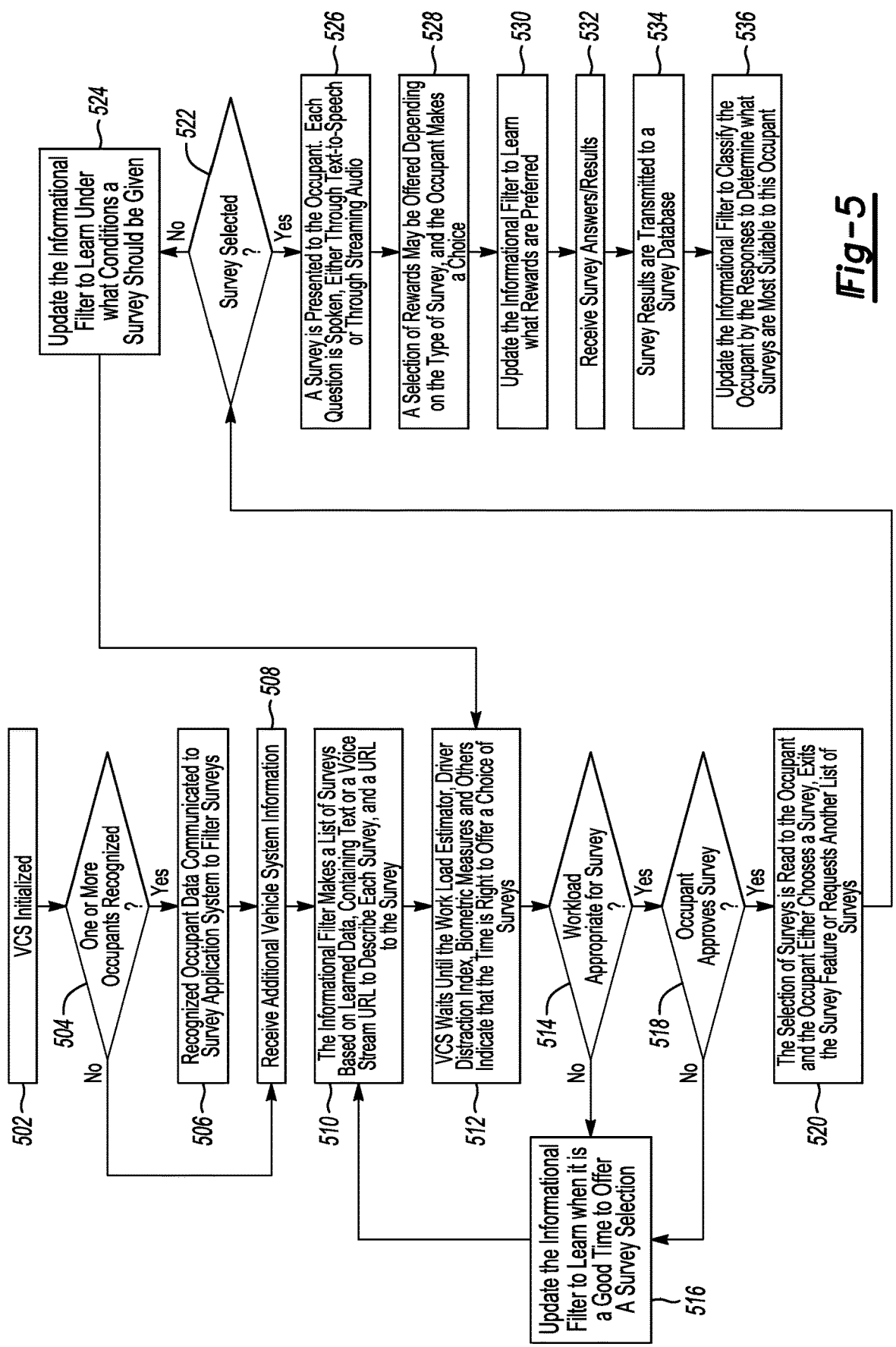
FIG. 5 is a flow diagram illustrating an example process of a vehicle computing system for controlling an occupant survey.

FIG. 5 is a flow diagram illustrating an example process of a vehicle computing system for controlling an occupant survey. In this illustrative example, a vehicle occupant may be able to take a survey associated with the identified occupant and/or several inputs from vehicle systems and sensors. A tailored specific survey delivered to the identified occupant may also be associated with a navigation route segment for example, "was the service you received at the gas station you just visited satisfactory", or "how did you like your coffee from Starbucks this morning". The survey could provide, as a reward, a coupon or discount for the product, or some other incentive for the driver to take the survey. Since a vehicle occupant may have a high workload during a survey, the system may postpone or save the survey for a later time once the workload and/or the occupant is available. Workload variables may include, but is not limited to, biometrics, occupant behavior, and/or monitoring occupant interaction with other vehicle features and systems.

In the example shown in FIG. 5, the process may be implemented through a computer algorithm, machine executable code, non-transitory computer readable medium, or software instructions programmed into a suitable programmable logic device(s) of the vehicle, such as the VCS, the entertainment module, other controller in the vehicle, or a combination thereof. The process may begin on a mobile device and communicated to the VCS for continued processing.

At step 502, the VCS may be initialized in one or more scenarios including, but not limited to, the ignition being turned on, an occupant entering a vehicle, a mobile device wirelessly communicating using Bluetooth low energy technology, and/or having a mobile device transmit an initialization signal to the VCS using WiFi. Once the VCS is initialized, the system may begin to detect one or more occupants in the vehicle at step 504. The recognition of an occupant may be accomplished using the information from a paired Bluetooth device, weight sensors, assigned keys, and/or in-vehicle cameras. If the process does not recognize one or more occupants, the process may continue at step 508.

At step 506, a recognized occupant data may be communicated to a survey application system to filter surveys. The survey application may be embedded in the VCS or running off a mobile device wirelessly communicating and integrated with the VCS. The received recognized occupant data may be transmitted to one or more servers/database to ensure specific surveys may be tailored to the recognized occupant's demographic. The survey application may also receive additional vehicle system information to use in the filtering process to determine which survey to transmit to the vehicle occupant at step 508. The additional vehicle system information may include, but is not limited to, navigation system, stored information regarding learned occupant behavior, GPS, occupant workload and/or wheel speed.

At step 510, the survey system informational filter may generate a list of surveys based on learned data, received data based on the recognized occupant, and/or the received additional vehicle system information. The informational filter may determine a list of surveys using text or a voice stream URL to describe each survey, and/or a URL to the survey. The VCS may wait before outputting the survey to a vehicle occupant until the workload estimator, driver distraction index, biometric measures, and/or other system and sensor indicate that the occupant may receive the list of survey choices at step 512.

The process may ensure that the workload is appropriate before outputting survey information to an occupant at step 514. If the workload is determined unsatisfactory for presenting survey information to an occupant, the process may update the informational filter to learn when it is a good time to offer a survey selection at step 516. The process may take the updated information and use it to filter a list of surveys based on learned data at step 510.

If the workload is appropriate to present survey information to an occupant, the process may ask the occupant if he/she wishes to receive survey data at step 518. If the occupant denies, the process may update the information filter to learn occupant behaviors and/or when is a good time to offer a survey selection at step 516. If the occupant approves of the survey information, the selection of survey(s) may be read to the occupant and the occupant may choose a survey, exit the survey feature, or request another list of surveys at step 520.

At step 522, if a survey is selected the process may begin to prepare to transmit the survey to the occupant. If the occupant does not select a survey, the process may update the informational filter to learn under what conditions a survey should be given to an occupant at step 524. The update informational filter to learn conditions when to present a survey is transmitted back to the one or more indicators that determine the right time to offer a choice of surveys at step 512.

At step 526, a survey may be presented to an occupant and each question may be spoken either through text-to-speech or through streaming audio. The survey may also be present in text on the in-vehicle display screen(s) and/or on the occupant's mobile device. A selection of rewards may be offered depending on the type of survey, and the occupant may make a choice of the reward he/she wants at step 528.

The selections, answers, and choices made by an occupant when taking the survey may be stored and used to update the informational filter to learn about the occupant at step 530. For example, the process may learn the type of reward the occupant prefers to induce them to take a survey and may store this information in the informational filter.

The occupant may pause, save, and/or continue a survey at a later time. The system may allow one or more inputs to determine a pause input and a continue input including, but is not limited to, voice, and/or HMI controls. The occupant may use one or more inputs for survey question response including, but is not limited to, voice, center console touch screen display, steering wheel controls, and or a mobile device communicating with the VCS. Once the occupant has completed the survey the VCS may receive and/or collect survey results at step 532. The process may also transmit the complete and/or collected survey responses/results to one or more servers, databases, or networks. Based on the occupant survey history stored in memory and/or a database, the survey provider may know the occupants preference to a certain survey category and transmit that type of survey to the occupant in a future survey. For example, the occupant may always complete political surveys or baby product review, therefore the system may transmit a survey related to political opinions and/or baby products to that occupant.

At step 534, the survey response/results may be transmitted to a survey database for further analysis and classification. The survey database may communicate with the process to update the informational filter based on the submitted survey results at step 536. The process may learn what are the most suitable surveys based on the submitted survey results for that vehicle occupant.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A system comprising:
a mobile-device processor configured to:
receive a survey on a mobile device communicably connected to a vehicle computing system (VCS);

instruct the VCS to output the survey using a vehicle output;

receive survey answers from the VCS, input using vehicle inputs;

terminate the survey before completion based on a determination that a driver attention requirement required for driving has risen above a predetermined threshold; and provide an uncompleted remainder of the survey, for completion, on the mobile device.

* * * * *